May 4, 1943.  W. L. FISCHER  2,317,983
TORSIONAL VIBRATION DAMPENER
Filed May 9, 1940  2 Sheets-Sheet 1
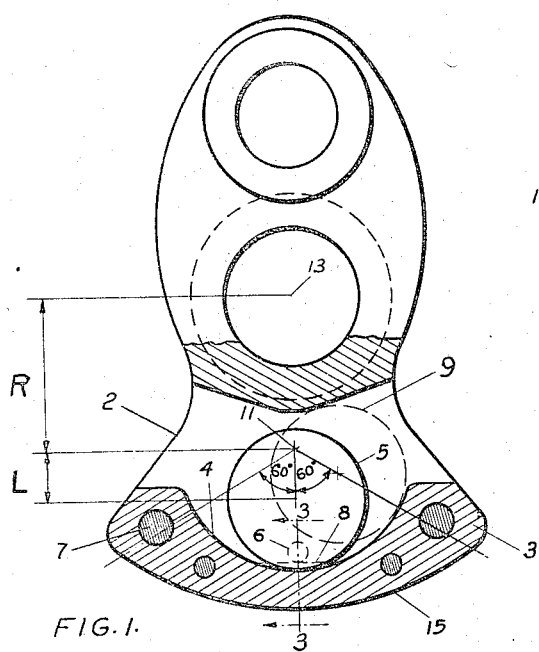
FIG. 1.
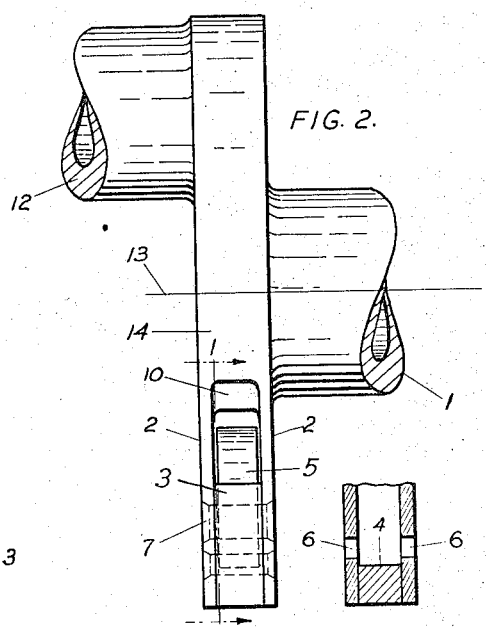
FIG. 2.
FIG. 3.
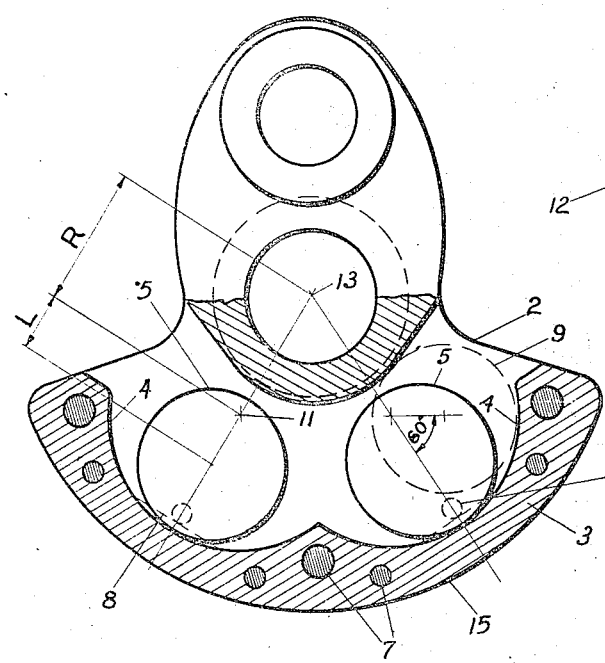
FIG. 4.
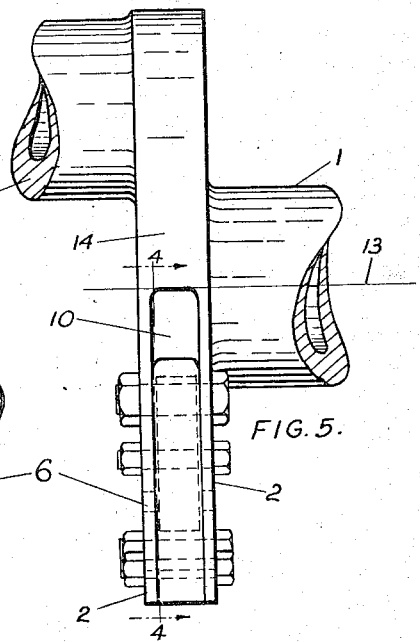
FIG. 5.
INVENTOR.
WILLIAM L. FISCHER
BY
ATTORNEY.

May 4, 1943.                    W. L. FISCHER                    2,317,983
                        TORSIONAL VIBRATION DAMPENER
                    Filed May 9, 1940              2 Sheets-Sheet 2

INVENTOR.
WILLIAM L. FISCHER
BY
ATTORNEY.

Patented May 4, 1943

2,317,983

UNITED STATES PATENT OFFICE 2,317,983

TORSIONAL VIBRATION DAMPENER

William L. Fischer, Philadelphia, Pa.

Application May 9, 1940, Serial No. 334,223

7 Claims. (Cl. 74—604)

(Granted under the act of March 3, 1883, as amended April 30, 1928; 370 O. G. 757)

This invention relates to a torsional vibration dampener and has for an object to provide a torsional vibration dampener of comparatively simple construction and having the minimum of moving parts and upkeep. A further object of this invention is to provide an improvement in the liquid torsional vibration dampeners shown in applicant's prior Patent No. 2,180,351 of November 21, 1939, in utilizing a solid resonance pendulum weight rather than the liquid pendulum weight therein disclosed.

Another object of this invention is to provide an improved torsional vibration dampener utilizing less movable parts and less fixed parts than used, for instance, in United States Patents Nos. 2,103,643 and 2,029,796, both of which show a now well-known torsional vibration dampener designed on the principle of the resonance pendulum.

The following invention, however, deals with a peculiar design of such a dampener, which for certain practical applications, offers considerable advantages, as will be shown. Especially in cases where little room is available for a dampener in the counterweight of a crankshaft and more so, if such a dampener has to be tuned to a low harmonic order, for example, to 1½ vibrations per crankshaft revolution, conventional designs lead to complicated and highly stressed structures and to very small roller masses. The prime object of this invention is to obtain a large pendulum roller mass and a simple and reliable construction for such cases as cited before. Other objects of this invention will become obvious from the following description and from the drawings, in which:

Fig. 1 is a partly sectional front view on line 1—1 of Fig. 2, of the dampener as applied to a crankcheek of a crankshaft;

Fig. 2 is a side view of Fig. 1;

Fig. 3 is a section on line 3—3 of Fig. 1;

Fig. 4 is a view similar to Fig. 1 on line 4—4 of Fig. 5 of a modified form utilizing two rollers;

Fig. 5 is a side view of Fig. 4;

In the various forms of the drawings the same reference numbers have been used where the same structure performing the same function is disclosed.

Figure 6:
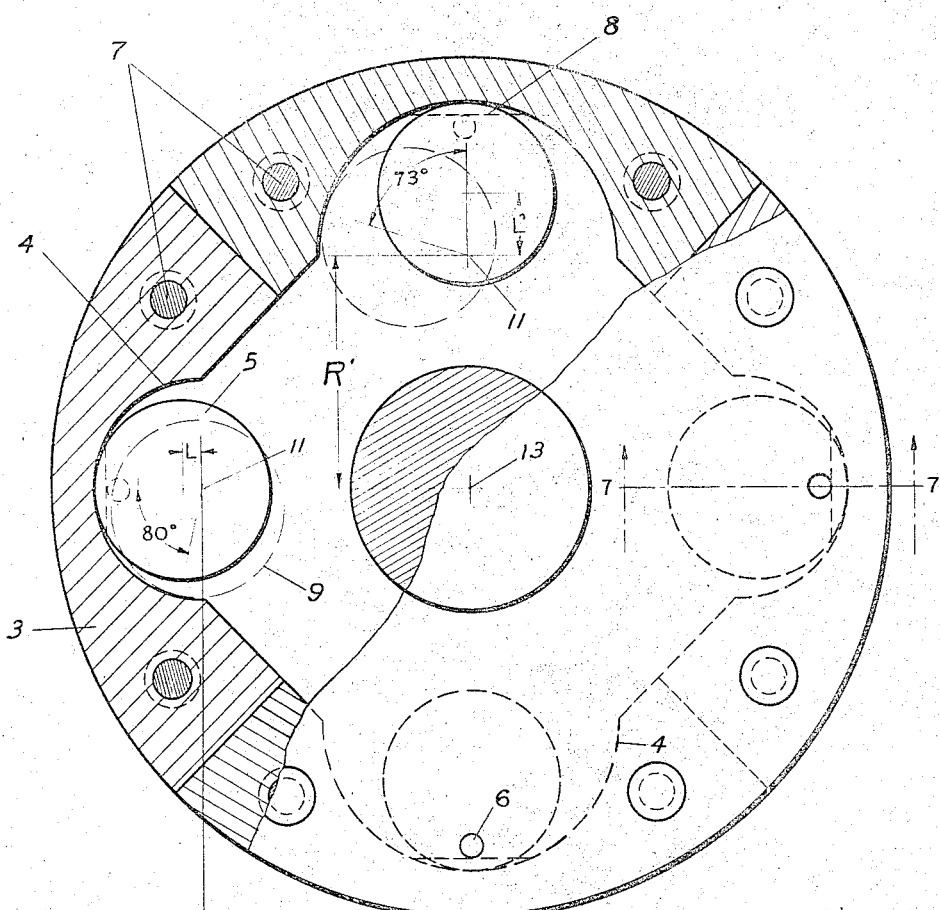
Fig. 6 is a partly sectional front view of the dampener utilizing a plurality of rollers as applied to a disk or flywheel mounted on a crankshaft.

There is shown at 1 the crankshaft of an in-line engine provided with a plurality of crankpins 12, only one of which is shown, rotatable about the axis of rotation 13. This crankshaft 1 is provided with a counterbalancing crankcheek 14 which instead of being solid, as customary, has been formed into two thin parallel flanges 2 integral with the crankshaft 1. Secured between the outer edges 15 of the flanges 2 of crankcheek 14 is an insert 3 held in position by bolts or countersunk rivets 7 and having an outer edge coinciding with the edge 15 of the crankcheek 14. An inner edge consisting of a concavely ground raceway 4 is formed on the insert 3 and provides a concave guiding surface for a cylindrical roller 5, this roller 5 being preferably made of a tungsten alloy rather than steel so as to have the maximum available mass within the limits provided by the available dimensions.

The center of curvature of the raceway 4 is located at 11 eccentric to the axis of rotation 13 and is such that the openings 10 left by the cavity formed by the insert 3 and flanges 2 is considerably less than the diameter of the roller 5. The roller 5 hits the cavity walls at the position 9 just before its peripheral edge would coincide with the side edges of the flanges 2. The openings 10 provide room for the admission of air and oil mist while the crankshaft 1 is rotating, the oil level being maintained at the position 8 during rotation of the crankshaft through the presence of oil drain holes 6 extending through the flanges 2 adjacent the point on the curvature of the raceway 4 which is furthermost from the axis of rotation 13.

This roller 5 has a small side clearance with respect to the flanges 2 and is free to oscillate under the action of centrifugal, vibration and inertia forces, which occur when the crankshaft is running under load and submitted to torsional vibrations of the 1½ order for example. In the design as shown in Fig. 1, the roller can travel approximately 60 degrees to either side from its neutral position before it hits the cavity walls, as indicated by item 9. According to the accepted theory of the pendulum dampener (see for example, J. P. den Hartog "Tuned Pendulums as Torsional Vibration Eliminators," MacMillan Co., 1938, page 25), the maximum damping torque producible with such a roller is reached at around 40 degrees to one side. It is therefore (with due regard to the fact that the roller will overrun the maximum torque position somewhat, but should not hit the stop) possible to reduce the raceway arc considerably, and in doing so R becomes small and for a given low harmonic order H the distance L becomes also small as per basic formula $L = R : H^2$, and a large size roller is the result.

For design conditions as illustrated by Figs. 1 and 2, the use of a conventional full circle raceway-bushing would lead to a roller diameter of about ¾₁₆" and thus to a mass much too small for practical use.

Figure 7:
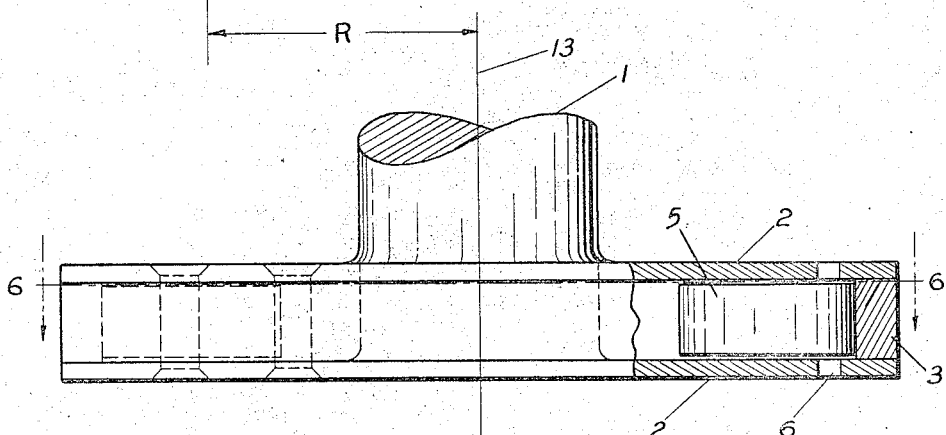
Fig. 7 is a partly sectional side view of Fig. 6.

While Figs. 1 and 2 show only one crank with one roller dampener, it is obvious that the new way of housing a roller dampener in a crankshaft counterweight could be used in various modifications. For example, two rollers could be housed side by side in one counterweight (see Figs. 4 and 5), or a number of rollers could be housed in a disk or flywheel rigidly attached to the crankshaft (see Figs. 6 and 7). Obviously such rollers could either all be tuned to the same or to different harmonic orders. For example, a six throw crankshaft having six counterweights could have one or more rollers in each counterweight and of various tunings, thus being protected against vibrations from various harmonics.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. In combination with a crankshaft, two parallel flanges protruding from a crankcheek in a direction substantially opposite to the crankpin and in a plane perpendicular to the axis of rotation of said crankshaft and defining a radial slot therebetween, the outer surfaces of the flanges being in the same planes as the outer surfaces of the crankcheek a rigid insert held rigidly within said radial slot between said two flanges, a concave raceway arc extending longitudinally on said insert, and a cylindrical wafer roller free to move along the concavity on said raceway arc between said two flanges.

2. In combination with a crankshaft, two parallel flanges protruding from a crankcreek in a direction substantially opposite to the crankpin and in a plane perpendicular to the axis of rotation of said crankshaft and defining a radial slot therebetween, the outer surfaces of the flanges being in the same planes as the outer surfaces of the crankcheek a rigid insert held rigidly within said radial slot between said two flanges, a concave raceway arc extending longitudinally on said insert, and a cylindrical wafer roller free to move along the concavity on said raceway arc between said two flanges, said two flanges being integral with the crankshaft structure.

3. In combination with a crankshaft, two parallel flanges protruding from a crankcheek in a direction substantially opposite to the crankpin and in a plane perpendicular to the axis of rotation of said crankshaft and defining a radiol slot therebetween, the outer surfaces of the flanges being in the same planes as the outer surfaces of the crankcheek a rigid insert held rigidly within said radial slot between said two flanges, a concave raceway arc extending longitudinally on said insert, and a cylindrical wafer roller free to move along the concavity on said raceway arc between said two flanges, said raceway conforming to a part of the lateral surface of a circular cylinder, whose main axis is parallel to the axis of rotation of said crankshaft, but offset from it in a direction opposite to the crankpin, the path of the generatrix of the lateral surface of the circular cylinder intersecting the crankshaft.

4. In combination with a crankshaft, two parallel flanges protruding from a crankcheek in a direction substantially opposite to the crankpin and in a plane perpendicular to the axis of rotation of said crankshaft and defining a radial slot therebetween, the outer surfaces of the flanges being in the same planes as the outer surfaces of the crankcheek a rigid insert held rigidly within said radial slot between said two flanges, a concave raceway arc extending longitudinally on said insert, the distance between the centers of the crankshaft and the arc on said insert being less than the sum of their radii, and a cylindrical wafer roller free to move along the concavity on said raceway arc between said two flanges, said raceway extending over not more than 180 degrees.

5. In combination with a crankshaft, two parallel flanges protruding from a crankcreek in a direction substantially opposite to the crankpin and in a plane perpendicular to the axis of rotation of said crankshaft and defining a radial slot therebetween, the outer surfaces of the flanges being in the same planes as the outer surfaces of the crankcheek a rigid insert held rigidly within said radial slot between said two flanges, a concave raceway arc extending longitudinally on said insert, the distance between the centers of the crankshaft and the arc on said insert being less than the sum of their radii, and a cylindrical wafer roller free to move along the concavity on said raceway arc between said two flanges, said cylindrical roller being free to roll, to slide, or to roll and slide over said raceway with little friction under the action of centrifugal, vibration and inertia forces.

6. In combination with a crankshaft, two parallel flanges protruding from a crankcheek in a direction substantially opposite to the crankpin and in a plane perpendicular to the axis of rotation of said crankshaft and defining a radial slot therebetween, the outer surfaces of the flanges being in the same planes as the outer surfaces of the crankcheek a rigid insert held rigidly within said radial slot between said two flanges, a concave raceway arc extending longitudinally on said insert, and a cylindrical wafer roller free to move along the concavity on said raceway arc between said two flanges, said two flanges being parallel to each other and as thin as stress considerations will permit to make them.

7. In combination with a crankshaft, two parallel flanges protruding from a crankcheek in a direction substantially opposite to the crankpin and in a plane perpendicular to the axis of rotation of said crankshaft and defining a radial slot therebetween, the outer surfaces of the flanges being in the same planes as the outer surfaces of the crankcheek a rigid insert held rigidly within said radial slot between said two flanges, a concave raceway arc extending longitudinally on said insert, the distance between the centers of the crankshaft and the arc on said insert being less than the sum of their radii, and a cylindrical wafer roller free to move along the concavity on said raceway arc between said two flanges, said roller having a diameter greater than the radius of said arc.

WILLIAM L. FISCHER.